(12) United States Patent
Kimpara et al.

(10) Patent No.: US 9,016,123 B2
(45) Date of Patent: Apr. 28, 2015

(54) ANGLE DETECTION METHOD WITH RESOLVER

(75) Inventors: Yoshihiko Kimpara, Chiyoda-ku (JP); Yasuaki Hori, Kobe (JP); Tatsuya Mori, Tokyo (JP); Takayuki Kifuku, Chiyoda-ku (JP); Takahiro Okanoue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 226 days.

(21) Appl. No.: 13/372,108

(22) Filed: Feb. 13, 2012

(65) Prior Publication Data

US 2013/0014583 A1 Jan. 17, 2013

(30) Foreign Application Priority Data

Jul. 15, 2011 (JP) ................................ 2011-156428

(51) Int. Cl.
*G01P 3/44* (2006.01)
*H02P 7/32* (2006.01)
*G06F 19/00* (2011.01)
*G06F 17/40* (2006.01)
*G01D 5/20* (2006.01)

(52) U.S. Cl.
CPC ................................ *G01D 5/2073* (2013.01)

(58) Field of Classification Search
None
See application file for complete search history.

(56) References Cited

U.S. PATENT DOCUMENTS

| 5,757,182 | A | * | 5/1998 | Kitazawa | 324/207.17 |
| 2009/0160436 | A1 | * | 6/2009 | Nishimura et al. | 324/207.25 |
| 2009/0179634 | A1 | * | 7/2009 | Nakazato et al. | 324/207.25 |
| 2010/0176975 | A1 | * | 7/2010 | Nakazato et al. | 341/118 |

FOREIGN PATENT DOCUMENTS

JP 2004-061157 A 2/2004

* cited by examiner

*Primary Examiner* — Patrick Assouad
*Assistant Examiner* — Hoang X Nguyen
(74) *Attorney, Agent, or Firm* — Sughrue Mion, PLLC; Richard C. Turner

(57) ABSTRACT

In an angle detection method with a resolver, the method being for detecting a rotational angle of a rotator by synchronously detecting a first signal and a second signal that are two phase sine wave modulation signals obtained from a one phase excitation/two phase output resolver, the method includes: a first signal detection process which detects a signal in the order of the first signal and the second signal; and a second signal detection process which detects a signal in the order of the second signal and the first signal.

7 Claims, 8 Drawing Sheets

ANGLE DETECTION METHOD WITH RESOLVER

BACKGROUND OF THE INVENTION

1. Field of the Invention

The present invention relates to an angle detection method with a resolver which detects a rotational angle of a rotator such as a motor by a signal obtained from a one phase excitation/two phase output resolver.

2. Description of the Related Art

A method which uses a one phase excitation/two faze output resolver is known as a method for detecting a rotational angle of a rotor of a rotating machine or the like. The one phase excitation/two phase output resolver receives an input of an excitation signal that is an alternating current signal and sends two phase signals (two phase sine wave modulation signals) in which amplitude modulation is performed by a cosine value and a sine value of a rotational angle using a coil excited by the excitation signal. Hereinafter, the respective phase signals are referred to as a first signal and a second signal respectively.

In the angle detection with the one phase excitation/two phase output resolver, the first signal and the second signal are detected with codes, resolver-to-digital conversion (referred to as "RD conversion" later) is performed by using a four quadrant arc tangent (a tan 2) in which the first signal and the second signal are used as inputs.

Here, the four quadrant arc tangent will be described. The usual arc tangent uses an amplitude ratio; and therefore, calculated results are in a range of −90 to +90 degrees. However, in the four quadrant arc tangent, not only the amplitude ratio but also codes of a sine signal (referred to as "sin signal" later) and a cosine signal (referred to as "cos signal" later) are taken into account; and accordingly, the calculated results can be obtained in a range of −180 to +180 degrees. For example, in the case where the first signal is the cos signal and the second signal is the sin signal, the four quadrant arc tangent is divided into the following cases: a first quadrant if the cos signal and the sin signal are both positive; a second quadrant if the cos signal is negative and the sin signal is positive; a third quadrant if the cos signal is negative and the sin signal is negative; and a fourth quadrant if the cos signal is positive and the sin signal is negative. Accordingly, the rotational angle can be obtained in the range of −180 to +180 degrees. The rotational angle can be obtained by the RD conversion using the four quadrant arc tangent.

The excitation signal of such a one phase excitation/two phase output resolver is the alternating current signal and the first signal and the second signal are alternating current signals synchronized with the excitation signal. In the case where the rotational angle is detected on the basis of the first signal and the second signal, the amplitude ratio of the first signal to the second signal is used; and therefore, the amplitude accuracy of the first signal and the second signal influences the detection accuracy of the rotational angle. The first signal and the second signal that are alternating current signals change their amplitude by detection time; and therefore, in the conventional angle detection method with the resolver, the first signal and the second signal are simultaneously detected in synchronization with the excitation signal. The reason is that, for example, if the second signal is detected after the first signal is detected, the second signal corresponding to the time at which the first signal is detected cannot be detected; and, as a result, the accuracy of the amplitude ratio of the first signal to the second signal cannot be maintained and position detection accuracy is also degraded.

The angle detection method with the resolver which simultaneously detects the first signal and the second signal of two phase outputs can maintain position detection accuracy by accurately obtaining the amplitude ratio of the first signal to the second signal; however, in order to simultaneously detect two phase output signals, hardware such as a microcomputer and a sample and hold circuit, both having a function capable of simultaneously detecting a plurality of signals, needs to be used. Such a microcomputer which detects the signals by providing a time difference is more inexpensive than the microcomputer which simultaneously detects a plurality of signals. However, problems exist in that if hardware such as the sample and hold circuit is added to such a microcomputer in order to simultaneously detect the first signal and the second signal, it causes cost-up by the hardware and the size of the entire circuit is increased by the size of the hardware.

In order to solve this problem, for example, in a conventional angle detection method disclosed in Patent Document 1, a signal processing method of a resolver which sends a rotational angle on the basis of two phase sine wave modulation signals includes: with respect to two phase signals sent from the resolver, a process of sampling signals of respective phases of the two phase signals respectively at a predetermined timing while sandwiching outbreak time of the peak amplitude of the two phase signals while a rotator is substantially stopped; and a process of calculating an angle on the basis of the respective sampled signals while performing correction of errors due to deviation of the timing of sampling between the respective phase signals.

In such a conventional angle detection method, it is supposed that the respective timings of sampling continuously performed two times are deviated by equal times from the peak respectively while sandwiching the peak; and therefore, the amplitude ratio of the first signal to the second signal can be accurately detected without simultaneously detecting the first signal and the second signal of the two phase outputs. As a result, an accurate rotational angle can be obtained without using hardware such as the microcomputer and the sample and hold circuit, both having the function capable of simultaneously detecting the plurality of signals.

PATENT DOCUMENT

[Patent Document 1] Japanese Unexamined Patent Publication No. 2004-61157 (Paragraph No. 0038, FIG. 5)

However, in the conventional angle detection method disclosed in Patent Document 1, a problem exists in that the accuracy of angle detection is degraded unless the respective timings of sampling continuously performed two times are deviated by equal times from the peak respectively while sandwiching the peak.

In such a conventional angle detection method, in order to maintain the accuracy of angle detection, the timing of sampling needs to be adjusted and a phase of the excitation signal needs to be adjusted.

Furthermore, usually, the outbreak time of the peak amplitude of the two phase signals of the resolver is maintained at a constant phase difference with the excitation signal; however, the phase difference is individually different depending on variations in manufacture and is changed by a change in temperature of the resolver; and therefore, desired detection accuracy cannot be obtained unless fine adjustment is performed for each resolver and the timing of sampling is adjusted by on-line control.

BRIEF SUMMARY OF THE INVENTION

The present invention has been made to solve the problem as described above, and an object of the present invention is to provide an angle detection method with a resolver in which an expensive hardware circuit, a complicated detection sequence, and the like are not required and the amplitude ratio of a first signal to a second signal is accurately detected even when there are an error of an outbreak time of the peak amplitude of two phase signals due to variations in manufacture and a change in temperature of the resolver; and, as a result, an accurate rotational angle can be obtained.

According to the present invention, there is provided an angle detection method with a resolver, the method being for detecting a rotational angle of a rotator by synchronously detecting a first signal and a second signal that are two phase sine wave modulation signals obtained from a one phase excitation/two phase output resolver, the method including: a first signal detection process which detects a signal in the order of the first signal and the second signal; and a second signal detection process which detects a signal in the order of the second signal and the first signal.

According to the angle detection method with the resolver of the present invention, in the method for detecting the angle using a four quadrant arc tangent (a tan 2) of the amplitude ratio of the first signal to the second signal obtained from the one phase excitation/two phase output resolver, remarkable advantageous effects which are not obtained by the conventional method can be exhibited in that a hardware configuration which simultaneously detects the first signal and the second signal is not required; and even when there are a change in temperature of the resolver and variations in manufacture, the amplitude ratio of the first signal to the second signal can be accurately detected, the angle can be accurately detected, and the like.

The foregoing and other object, features, and advantages of the present invention will become more apparent from the following detailed description of preferred embodiments and description shown in the accompanying drawings.

DETAILED DESCRIPTION OF THE INVENTION

Preferred Embodiment 1

Figure 1:
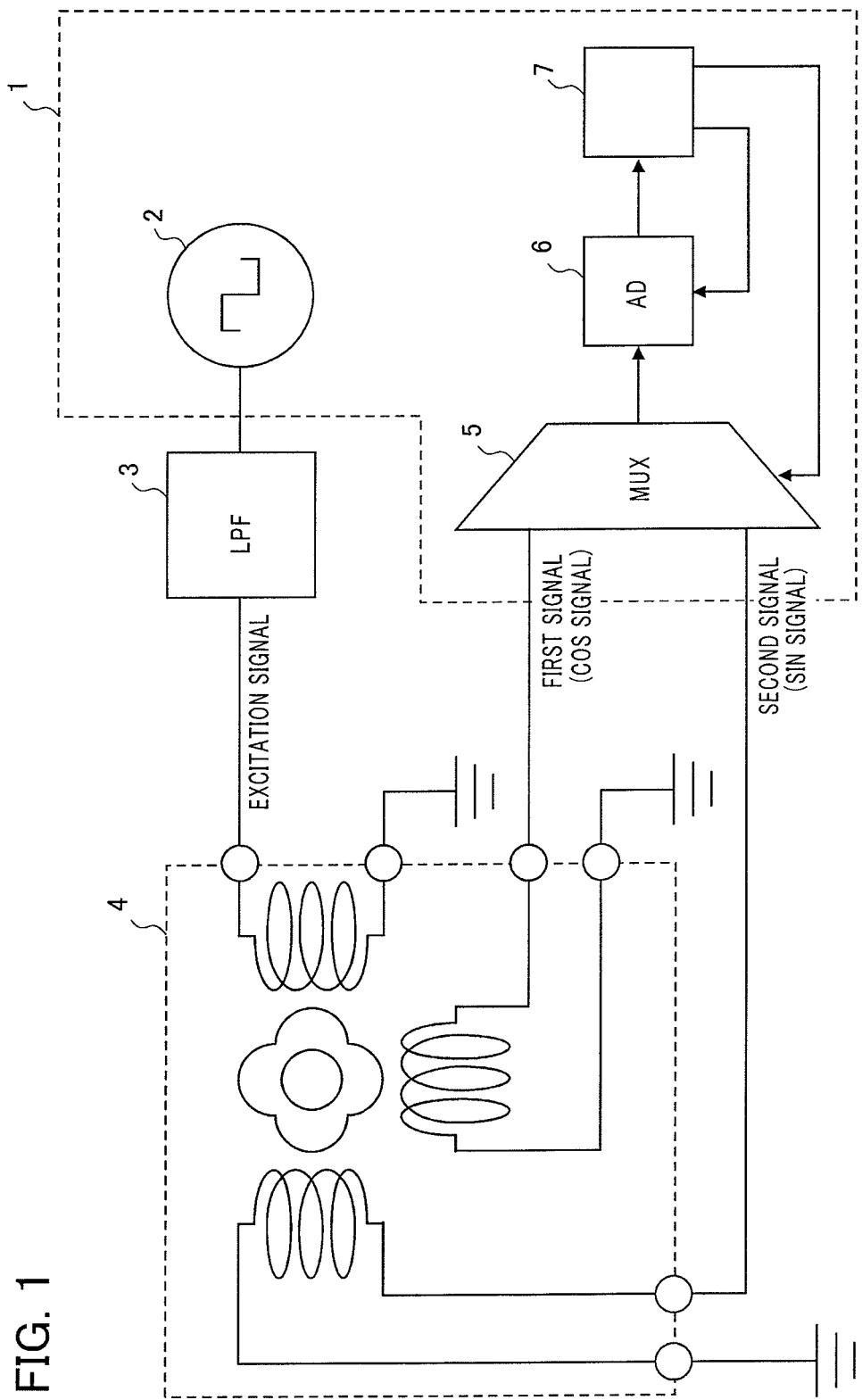
FIG. 1 is a configuration diagram for explaining an angle detection method with a resolver in a preferred embodiment 1 of the present invention.

FIG. 1 is a configuration diagram for explaining an angle detection method with a resolver in a preferred embodiment 1 of the present invention. In FIG. 1, a microcomputer 1 is equipped with a rectangular wave voltage output unit 2. A rectangular wave voltage which is sent by the rectangular wave voltage output unit 2 is converted from a rectangular wave to a sine wave shaped signal by an analog low pass filter 3 and is sent to a resolver 4 as an excitation signal.

A frequency of the rectangular wave voltage which is sent by the rectangular wave voltage output unit 2 is set to 10 kHz in the preferred embodiment 1; however, other frequency may be permissible. The resolver 4 is a one phase excitation/two phase output resolver, the excitation signal is applied thereto, and two phases of a first signal (cos signal) and a second signal (sin signal) are sent therefrom.

Frequencies of the first signal and the second signal which are sent by the resolver 4 are the same as that of the excitation signal applied to the resolver 4.

The microcomputer 1 is equipped with a multiplexer 5, and the aforementioned first signal (cos signal) and the aforementioned second signal (sin signal) are applied to the multiplexer 5. A signal selected by the multiplexer 5 is sent to an analog/digital converter (referred to as "A/D converter" later) 6. The A/D converter 6 performs analog/digital conversion of an analog signal obtained from the multiplexer 5, and sends a digital signal to a calculating unit 7. The calculating unit 7 sends the signal to be selected by the multiplexer 5 to the multiplexer 5 and sends a detection trigger signal to the A/D converter 6 at the timing at which the A/D converter 6 should select the signal.

Figure 2:
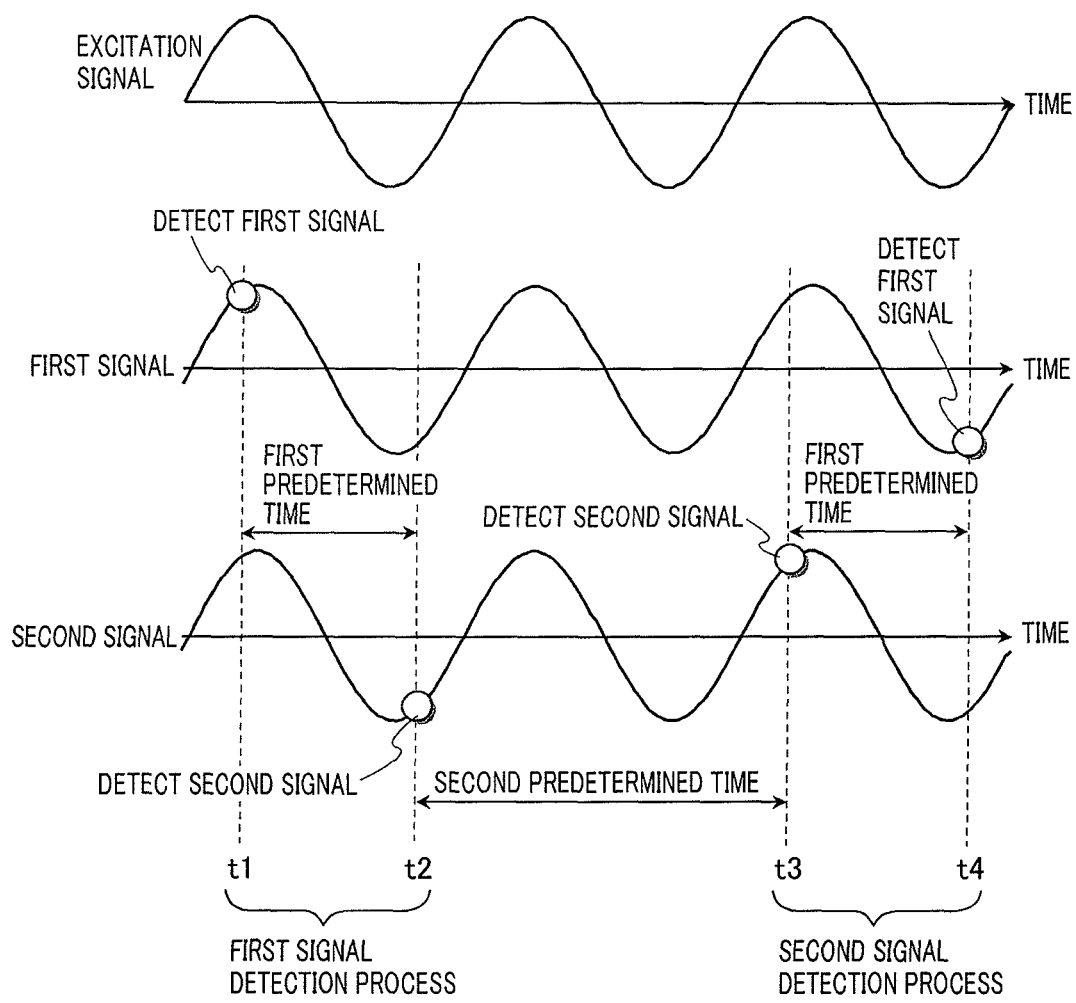
FIG. 2 is a view showing the timing at which a first signal and a second signal are detected for explaining the operation of the preferred embodiment 1 of the present invention.
Figure 3:
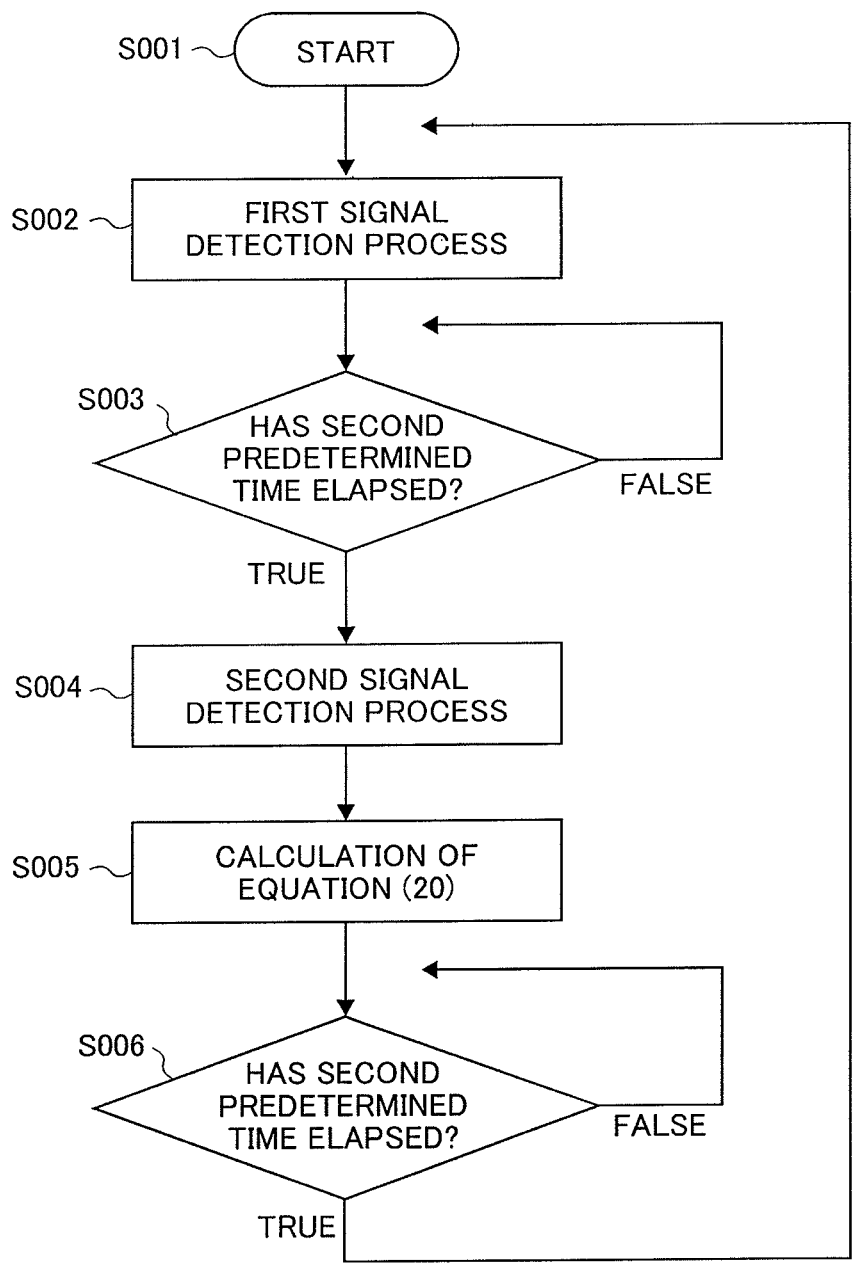
FIG. 3 is a flowchart showing processing steps for explaining the operation of the preferred embodiment 1 of the present invention.

The timing at which the first signal and the second signal in the preferred embodiment 1 of the present invention are detected, is shown in FIG. 2. Furthermore, a flowchart of processing steps for explaining the operation of the preferred embodiment 1 is shown in FIG. 3.

FIG. 2 shows the operation of the preferred embodiment 1 and a rotational angle is 45 degrees.

Furthermore, a horizontal axis is time and a vertical axis is the amplitude of each signal. An upper column of FIG. 2 is an excitation signal waveform; a middle column is a first signal waveform, and a lower column is a second signal waveform.

In the preferred embodiment 1, as shown in FIG. 2, the relationship of "first predetermined time ($\Delta T$)"+"second predetermined time"="2 periods (2T) of excitation signal" is maintained, and the first signal detection process and the second signal detection process are made to synchronize with the excitation signal respectively.

Here, the "first predetermined time" and the "second predetermined time" will be described.

In FIG. 2, the first signal is detected at time t1, and the second signal is detected at time t2 at which the first predetermined time has elapsed from time t1. In synchronization with the excitation signal, a detection process in which the first signal is detected at time t1 and the second signal is detected at time t2 after the first predetermined time, is defined as a first signal detection process.

The second signal is detected at time t3 after the elapse of the second predetermined time from time t2, and the first signal is detected at time t4 after the elapse of the first predetermined time from time t3. A detection process in which the second signal is detected at time t3 after the elapse of the second predetermined time from the first signal detection process and the first signal is detected at time t4 after the elapse of the first predetermined time, is defined as a second signal detection process.

In FIG. 2, in the case where the excitation signal described in the first column is applied to the resolver, the first signal and the second signal which are sent by the resolver at time t can be described as y1(t) and y2(t) respectively.

$$y_1(t) = A \cos\theta \cdot f(t) + B \quad (1)$$

$$y_2(t) = A \sin\theta \cdot f(t) + C \quad (2)$$

In equation (1) and (2), A denotes a constant proportional to the amplitude of the excitation signal, B and C each denotes a detection offset, θ denotes a rotational angle of the resolver, and f(t) denotes a periodic function of a frequency 10 kHz. The frequency of f(t) coincides with the frequency of the excitation signal, and the periodic function f(t) satisfies relationships of the following equation (3) and (4).

$$f(t) = f(t + mT) \quad (3)$$

$$f(t) = -f\left(t - \left(n + \frac{1}{2}\right)T\right) \quad (4)$$

In equation (3) and (4), m and n each denotes an arbitrary integer, T denotes a period of f(t), and T in the preferred embodiment 1 is 100 μsec. Equation (3) means that f(t) at time t is the same in amplitude as f(t−T/2) before ½ period, but different in code. That is to say, f(t) at time t and f(t−T/2) before ½ period are possibly the same shaped waveforms inverted for each T/2 period. If the excitation signal is a sine wave shape, f(t) is a trigonometric function of the frequency 10 kHz; and therefore, equation (3) is established. However, even if the excitation signal has distortion, equation (3) is established if f(t) at time t is the same in amplitude as f(t−T/2) before ½ period, but different in code.

First, the amplitude of the first signal will be found.

The first signal y1(t1) at time t1 is equation (5), and the first signal y1(t4) at time t4 is equation (6).

$$y_1(t1) = A \cos\theta \cdot f(t1) + B \quad (5)$$

$$y_1(t4) = A \cos\theta \cdot f(t4) + B \quad (6)$$

Equation (7) is obtained by subtracting equation (6) from equation (5).

$$y_1(t1) - y_1(t4) = A \cos\theta \cdot (f(t1) - f(t4)) \quad (7)$$

When a first predetermined time is ΔT1, the relationship of equation (8) is established between time t1 and time t4.

$$t4 = t1 + 2T + \Delta T1 \quad (8)$$

Equation (9) is obtained from the relationship between the aforementioned equation (4) and equation (8).

$$f(t4) = f(t1 + 2T + \Delta T) = -f\left(t1 + \frac{T}{2} + \Delta T\right) = f(t1 + \Delta T) \quad (9)$$

Equation (10) is obtained by substituting equation (9) into equation (6).

$$y_1(t1) - y_1(t4) = A \cos\theta \cdot (f(t1) - f(t4)) = A \cos\theta \cdot (f(t1) - f(t1 + \Delta T)) \quad (10)$$

Similarly, the amplitude of the second signal will be found.

The first signal y2(t2) at time t2 is equation (11), and the second signal y2(t3) at time t3 is equation (12).

$$y_2(t2) = A \sin\theta \cdot f(t2) + C \quad (11)$$

$$y_2(t3) = A \sin\theta \cdot f(t3) + C \quad (12)$$

Equation (13) is obtained by subtracting equation (12) from equation (11).

$$y_2(t2) - y_2(t3) = A \sin\theta \cdot (f(t2) - f(t3)) \quad (13)$$

When the first predetermined time is ΔT1, the relationship of equation (14) is established between time t2 and time t3.

$$t3 = t2 + 2T - \Delta T1 \quad (14)$$

Equation (15) is obtained from the relationship between the aforementioned equation (4) and equation (14).

$$f(t2) = f(t3 - 2T + \Delta T) = -f\left(t3 + \frac{T}{2} + \Delta T\right) = f(t3 + \Delta T) \quad (15)$$

Equation (16) is obtained by substituting equation (15) into equation (13).

$$y_2(t2) - y_2(t3) = A \sin\theta \cdot (f(t2) - f(t3)) = -A \sin\theta \cdot (f(t3) - f(t3 + \Delta T)) \quad (16)$$

In FIG. 2, as described above, the relationship of the "first predetermined time (ΔT)"+"second predetermined time"="2 periods (2T) of excitation signal" is established; and therefore, the relationship of equation (17) is established between time t1 and time t3.

$$t3 - t1 = 2T \quad (17)$$

Equation (16) may be replaced with equation (18) from the relationship between the aforementioned equation (3) and equation (17).

$$y_2(t2) - y_2(t3) = -A \sin\theta \cdot (f(t1) - f(t1 + \Delta T)) \quad (18)$$

Equation (19) can be obtained from the aforementioned equation (10) and equation (18).

$$\frac{y_2(t2) - y_2(t3)}{y_1(t1) - y_1(t4)} = \frac{-A\sin\theta \cdot (f(t1) - f(t1 + \Delta T))}{A\cos\theta \cdot (f(t1) - f(t1 + \Delta T))} = -\frac{\sin\theta}{\cos\theta} = -\tan\theta \quad (19)$$

Therefore, if in accordance with equation (20) using a four quadrant arc tangent a tan 2, the rotational angle θ of the resolver can be obtained.

$$\theta = -\mathrm{atan2}\left(\frac{y_2(t2) - y_2(t3)}{y_1(t1) - y_1(t4)}\right) \quad (20)$$

As described in FIG. 2, the second signal detection process is performed while sandwiching zero cross point of the excitation signal after the first signal detection process is performed; and the first signal detection process is performed while sandwiching zero cross points of the first signal and the second signal after the second signal detection process is performed.

By performing such a detection method, advantageous effects are obtained in that the time difference between the first signal detection process and the second signal detection process can be secured, the first signal and the second signal do not need to be simultaneously detected in synchronization with the excitation signal, and an accurate rotational angle can be obtained without using hardware such as a microcomputer and a sample and hold circuit, both having a function capable of simultaneously detecting a plurality of signals.

Furthermore, the first signal detection process in which the first signal is detected in synchronization with the excitation signal and the second signal is detected after the elapse of the first predetermined time, and the second signal detection process in which the second signal is detected after the elapse of the second predetermined time from the first signal detection process and the first signal is detected after the elapse of the first predetermined time are included; and therefore, the first signal or the second signal is detected at different time t1, t2, t3, or t4 and thus a rotational position can be obtained despite that the first signal and the second signal are not simultaneously detected.

In the conventional angle detection method with the resolver, the problem exists in that the accuracy of angle detection is degraded unless the respective timings of sampling continuously performed two times are deviated by equal times from the peak respectively while sandwiching the peak. In the angle detection method with the resolver described in the preferred embodiment 1, as is apparent from equation (20), advantageous effects are obtained in that the timings of sampling performed two times do not need to be deviated by equal times from the peak respectively while sandwiching the peak, and fine adjustment for each resolver and adjustment of the timing of sampling by on-line control are not needed even when the time difference between an outbreak time of the peak amplitude of two phase signals of the resolver and a outbreak time of the peak of the excitation signal is individually different due to variations in manufacture or the like and is changed due to a change in temperature of the resolver, and desired detection accuracy can be obtained.

FIG. 3 is a flowchart showing processing steps of the angle detection method with the resolver of the preferred embodiment 1. The flowchart starts from step S001.

The first signal detection process is executed in step S002. In the first detection process, values of the aforementioned y1(t1) and y2(t2) are obtained. In step S003, confirmation is made as to whether or not the second predetermined time has elapsed from the completion of the execution of the first signal detection process (step S002); and a process of FALSE is performed in step S003 if the second predetermined time has not elapsed and a process of TRUE is performed in step S003 if the second predetermined time has elapsed.

The second signal detection process is executed in step S004. In the second detection process, values of the aforementioned y2 (t3) and y1(t4) are obtained. In step S005, the calculation of the aforementioned equation (20) is performed and the rotational angle θ of the resolver is obtained. In step S006, confirmation is made as to whether or not the second predetermined time has elapsed from the completion of the execution of the second signal detection process (step S004); and the process of FALSE is performed in S006 if the second predetermined time has not elapsed, and the process of TRUE is performed in step S006 if the second predetermined time has elapsed.

The rotational angle of the resolver can be sequentially detected by the process which complies with the flowchart of FIG. 3.

Figure 4:
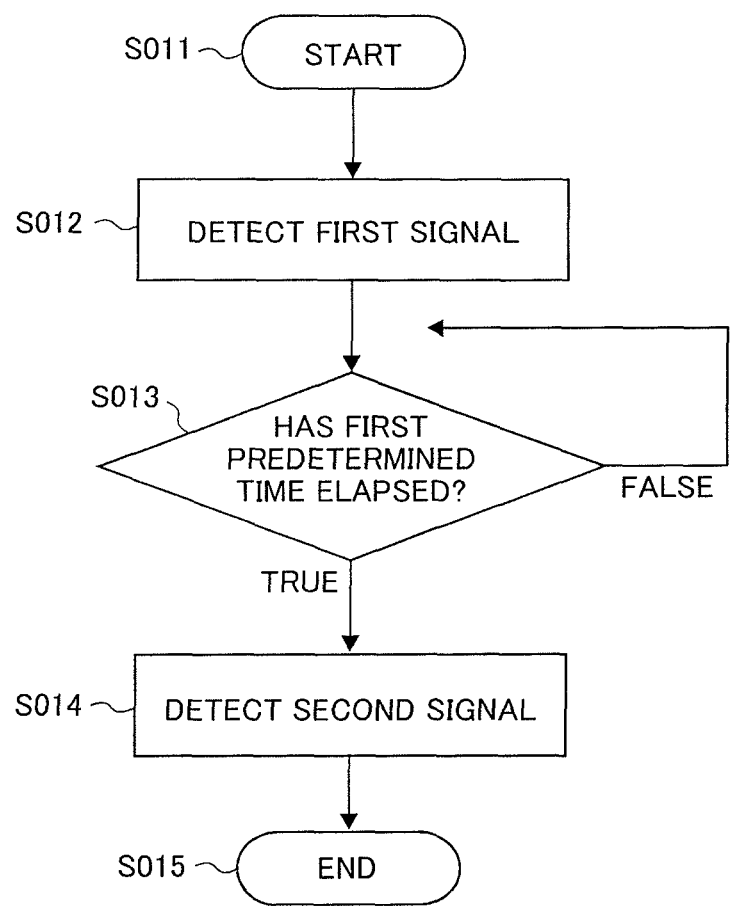
FIG. 4 is a flowchart related to a first signal detection process of step S002 in the preferred embodiment 1 of the present invention.

FIG. 4 is a flowchart described regarding the first signal detection process described in the aforementioned step S002, and the flowchart starts from step S011. In step S012, the first signal is detected. The time of this step is t1, the detected first signal is stored as y1(t1).

In step S013, confirmation is made as to whether or not the first predetermined time ΔT has elapsed from the completion of the detection (step S012) of the first signal; and the process of FALSE is performed in step S013 if the first predetermined time has not elapsed and the process of TRUE is performed in step S013 if the first predetermined time has elapsed.

In step S014, the second signal is detected. The time of this step is t2, the detected second signal is stored as y2(t2). In step S015, the first signal detection process is completed.

Figure 5:
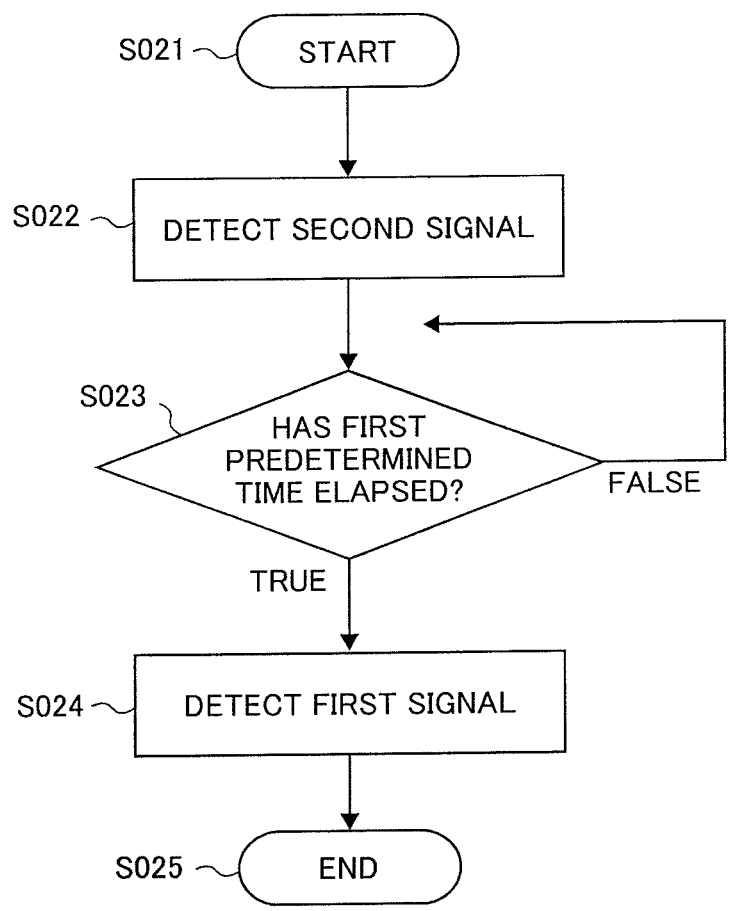
FIG. 5 is a flowchart related to a second signal detection process of step S006 in the preferred embodiment 1 of the present invention.

FIG. 5 is a flowchart described regarding the second signal detection process described in the aforementioned step S006, and the flowchart starts from step S021. In step S022, the second signal is detected. The time of this step is t3, and the detected second signal is stored as y2(t3).

In step S023, confirmation is made as to whether or not the first predetermined time ΔT has elapsed from the completion of the detection (step S022) of the second signal; and the process of FALSE is performed in step S023 if the first predetermined time has not elapsed and the process of TRUE is performed in step S023 if the first predetermined time has elapsed.

In step S024, the first signal is detected. The time of this step is t4, and the detected first signal is stored as y1(t4). In step S025, the second signal detection process is completed.

As described above, according to the angle detection method with the resolver of the preferred embodiment 1 of the present invention, in the method for detecting the angle by synchronously detecting the first signal and the second signal that are two phase sine wave modulation signals obtained from the one phase excitation/two phase output resolver 4, the first signal detection process in which the first signal is detected in synchronization with the excitation signal and the second signal is detected after the elapse of the first predetermined time, and the second signal detection process in which the second signal is detected after the elapse of the second predetermined time from the first signal detection process and the first signal is detected after the elapse of the first predetermined time are included; and therefore, the amplitude ratio of the first signal to the second signal can be accurately detected without simultaneously detecting the first signal and the second signal of two phase outputs. Additionally, as is apparent from FIG. 2 and equation (20), even when the respective timings of sampling continuously performed two times are not deviated by equal times from the peak respectively while sandwiching the peak, the angle can be accurately detected. Therefore, an advantageous effect is obtained in that desired detection accuracy is maintained even when the phase difference between the outbreak time of the peak amplitude of each of the two phase signals and the excitation signal of the resolver is individually different due to variations in manufacture or the like and is changed due to a change in temperature of the resolver.

Furthermore, the second signal detection process is performed while sandwiching the zero cross point of the excitation signal after the first signal detection process is performed, and the first signal detection process is performed while sandwiching the zero cross point of the excitation signal after the second signal detection process is performed; and accordingly, advantageous effects are obtained in that the time difference between the first signal detection process and the second signal detection process can be secured, the first signal and the second signal do not need to be simultaneously detected in synchronization with the excitation signal, and the accurate rotational angle can be obtained without using the hardware such as the microcomputer and the sample and hold circuit, both having the function capable of simultaneously detecting the plurality of signals.

As described above, in the angle detection method with the resolver of the preferred embodiment 1, the hardware for simultaneous detection is not required. Furthermore, advantageous effects exist in that dedicated timing adjustment of the sampling and phase adjustment of the excitation signal, which are deviated by equal times from the peak respectively while sandwiching the peak that is required for the conventional angle detection method with the resolver are not needed, and the degradation of the detection accuracy due to the variations in manufacture and the change in temperature of the resolver can be suppressed.

Preferred Embodiment 2

The first predetermined time is set larger than a half period of the excitation signal in the preferred embodiment 1; however, in a preferred embodiment 2, a first predetermined time is set within a half period of an excitation signal.

Figure 6:
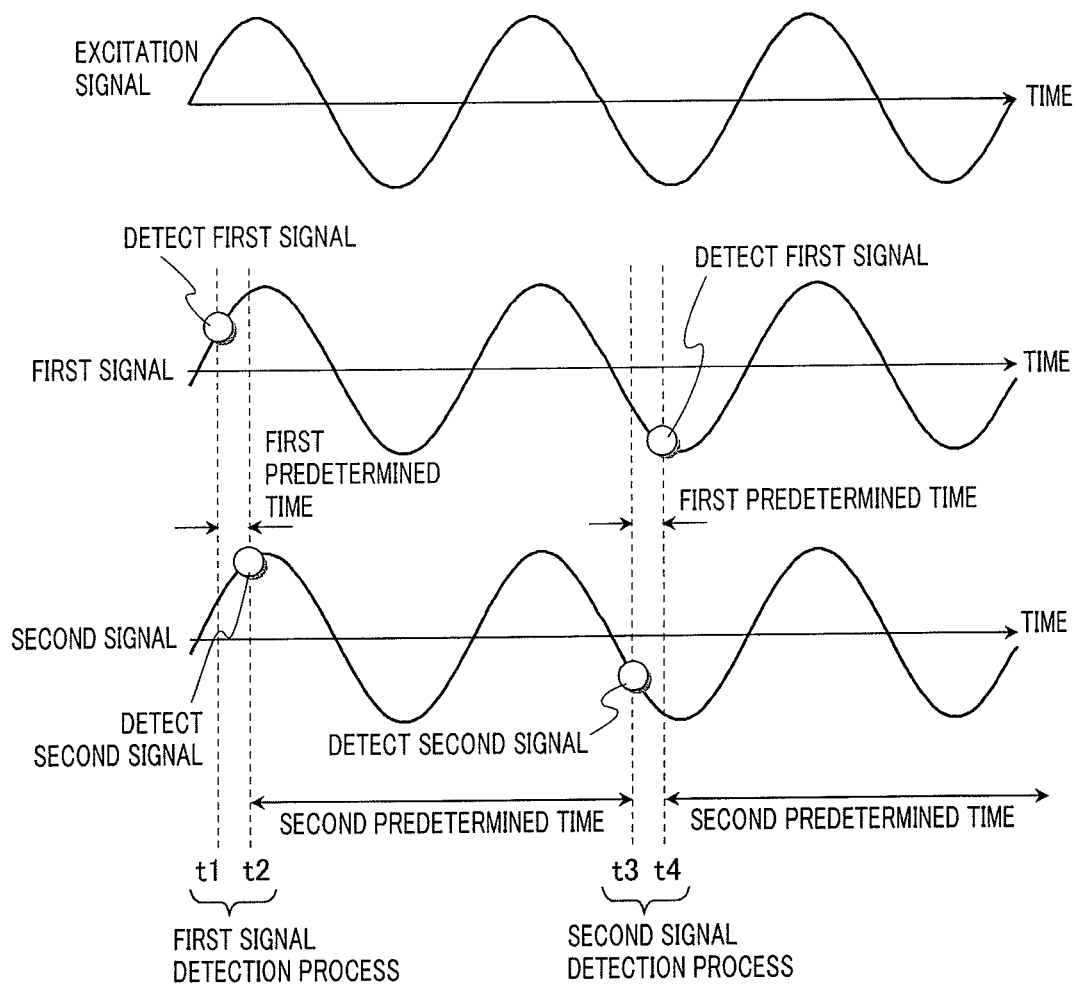
FIG. 6 is a view showing the timing at which a first signal and a second signal are detected for explaining the operation of a preferred embodiment 2 of the present invention.

FIG. 6 is a view showing the operation of the preferred embodiment 2 and a rotational angle is 45 degrees as in FIG. 2 of the preferred embodiment 1. Furthermore, a horizontal axis is time and a vertical axis is the amplitude of each signal.

An upper column of FIG. 6 is an excitation signal waveform; a middle column is a first signal waveform, and a lower column is a second signal waveform.

In the preferred embodiment 2, as shown in FIG. 6, the relationship of "first predetermined time (ΔT)"+"second predetermined time"="1.5 period (1.5T) of excitation signal" is maintained, and a first signal detection process and a second signal detection process are made to synchronize with the excitation signal respectively.

Also in the preferred embodiment 2, the relationship of the aforementioned equation (1), (2), (3) and (4) is established in the first signal and the second signal which are sent by a resolver at time t.

The amplitude of the first signal in the preferred embodiment 2 will be found. The first signal y1(t1) at time t1 is the following equation (21), and the first signal y1(t4) at time t4 is equation (22).

$$y_1(t1) = A \cos\theta \cdot f(t1) + B \tag{21}$$

$$y_1(t4) = A \cos\theta \cdot f(t4) + B \tag{22}$$

Equation (23) is obtained by subtracting equation (22) from equation (21).

$$y_1(t1) - y_1(t4) = A \cos\theta \cdot (f(t1) - f(t4)) \tag{23}$$

When the first predetermined time is ΔT1, the relationship of equation (24) is established between time t1 and time t4.

$$t4 = t1 + 1.5T + \Delta T1 \tag{24}$$

Equation (25) is obtained from the relationship between the aforementioned equation (4) and equation (24).

$$f(t4) = f(t1 + 1.5T + \Delta T) = -f(t1 + \Delta T) \tag{25}$$

Equation (26) is obtained by substituting equation (25) into equation (23)

$$y_1(t1) - y_1(t4) = A \cos\theta \cdot (f(t1) - f(t4)) = A \cos\theta \cdot (f(t1) + f(t1 + \Delta T)) \tag{26}$$

Similarly, the amplitude of the second signal will be found. The first signal y2(t2) at time t2 is equation (27), and the second signal y2(t3) at time t3 is equation (28).

$$y_2(t2) = A \sin\theta \cdot f(t2) + C \tag{27}$$

$$y_2(t3) = A \sin\theta \cdot f(t3) + C \tag{28}$$

Equation (29) is obtained by subtracting equation (28) from equation (27).

$$y_2(t2) - y_2(t3) = A \sin\theta \cdot (f(t2) - f(t3)) \tag{29}$$

When the first predetermined time is ΔT1, the relationship of equation (30) is established between time t2 and time t3.

$$t3 = t2 + 1.5T - \Delta T1 \tag{30}$$

Equation (31) is obtained from the relationship between the aforementioned equation (4) and equation (30).

$$f(t2) = f(t3 - 1.5T + \Delta T) = -f(t3 + \Delta T) \tag{31}$$

Equation (32) is obtained by substituting equation (31) into equation (29).

$$y_2(t2) - y_2(t3) = A \sin\theta \cdot (f(t2) - f(t3)) = -A \sin\theta \cdot (f(t3) + f(t3 + \Delta T)) \tag{32}$$

In FIG. 6, as described above, the relationship of the "first predetermined time (ΔT)"+"second predetermined time"="1.5 period (1.5T) of excitation signal" is established; and therefore, the relationship of equation (33) is established between time t1 and time t3.

$$t3 - t1 = 1.5T \tag{33}$$

Equation (32) may be replaced with equation (34) from the relationship between the aforementioned equation (4) and equation (33).

$$y_2(t2) - y_2(t3) = A \sin\theta \cdot (f(t1) + f(t1 + \Delta T)) \tag{34}$$

Equation (35) can be obtained from the aforementioned equation (26) and equation (34).

$$\frac{y_2(t2) - y_2(t3)}{y_1(t1) - y_1(t4)} = \frac{A\sin\theta \cdot (f(t1) + f(t1 + \Delta T))}{A\cos\theta \cdot (f(t1) + f(t1 + \Delta T))} = \frac{\sin\theta}{\cos\theta} = \tan\theta \tag{35}$$

Therefore, if in accordance with the following equation (36) using a four quadrant arc tangent a tan 2, a rotational angle θ of the resolver can be obtained.

$$\theta = \operatorname{atan2}\left(\frac{y_2(t2) - y_2(t3)}{y_1(t1) - y_1(t4)}\right) \tag{36}$$

A flowchart showing processing steps of an angle detection method with the resolver in the preferred embodiment 2 is similar to FIG. 3 and FIG. 4; and different points are as follows: values of the first predetermined time and the second predetermined time are different, and the calculation of step S005 of FIG. 3 executes equation (36) in place of calculating equation (20).

In the preferred embodiment 2, the first predetermined time is set within a half period of the excitation signal. For example, the first signal y1(t1) at time t1 is equation (21), and the second signal y2(t2) at time t2 is equation (27). In the case where the rotational angle θ of the resolver is changed depending on time, to be exact, values of the rotational angle of the resolver at time t1 and time t2 are different; however, if the interval between time t1 and time t2 is sufficiently short, it can be assumed that the rotational angle of the resolver at time t1 and time t2 is hardly changed. This is also similar to the second signal y2(t3) at time t3 and the first signal y1(t4) at time t4. Consequently, in the preferred embodiment 2, the interval between time t1 and time t2 and the interval between time t3 and time t4 are set sufficiently short by setting the first predetermined time within the half period of the aforementioned excitation signal; and therefore, advantageous effects are obtained in that, in addition to the advantageous effects in the preferred embodiment 1, the rotational angle can be accurately detected even in the case where the rotational angle is changed.

Furthermore, the first signal detection process and the second signal detection process in the preferred embodiment 1 include the vicinity of zero cross points of the first signal and the second signal: however, the first signal detection process and the second signal detection process in the preferred embodiment 2 are performed excluding the vicinity of zero cross points of the first signal and the second signal as described in FIG. 6.

For example, in the case where the first signal is detected in the vicinity of the zero cross point of the first signal, the detected first signal is a value near zero. Similarly, in the case where the second signal is detected in the vicinity of the zero cross point of the second signal, the detected second signal is a value near zero. Also in such a case, advantageous effects exist in that the aforementioned equation (36) is established if the detection time does not completely coincide with the zero cross points of the first signal and the second signal, and desired detection accuracy is maintained even when the phase difference between an outbreak time of the peak amplitude of two phase signals and the excitation signal of the resolver is individually different due to variations in manufacture or the like and is changed by a change in temperature of the resolver.

However, it is obvious that the amplitude of the detected first signal and the second signal is small, a signal to noise ratio (referred to as "S/N ratio") is small, and the ratio is susceptible to noise.

On the other hand, in the preferred embodiment 2, the first signal detection process and the second signal detection process are performed excluding the vicinity of zero cross points of the first signal and the second signal; and therefore, an advantageous effect exists in that the S/N ratio is increased and thus error against noise is suppressed.

In order to increase the S/N ratio, the first signal detection process and the second signal detection process may be performed in the vicinity of the peaks of the first signal and the second signal; and accordingly, the advantageous effect can be obtained in that the S/N ratio is enhanced and thus the error against noise is further suppressed.

Additionally, as is apparent from FIG. 6 and equation (36), even when the respective timings of sampling continuously performed two times are not deviated by equal times from the peak respectively while sandwiching the peak, the angle can be accurately detected. Therefore, an advantageous effect is obtained in that desired detection accuracy is maintained even when the phase difference between the outbreak time of the peak amplitude of the two phase signals and the excitation signal of the resolver is individually different due to the variations in manufacture or the like and is changed due to the change in temperature of the resolver.

Preferred Embodiment 3

In the angle detection method with the resolver in the preferred embodiment 2, the second signal is detected before the first signal and the second signal reach the peaks after the first signal is detected in the first signal detection process; and in the second signal detection process, the first signal is detected before the first signal and the second signal reach the peaks after the second signal is detected.

On the other hand, in an angle detection method with a resolver of a preferred embodiment 3, a second signal is detected while sandwiching the peaks of a first signal and the second signal after the first signal is detected in a first signal detection process; and in a second signal detection process, the first signal is detected while sandwiching the peaks of the first signal and the second signal after the second signal is detected.

Figure 7:
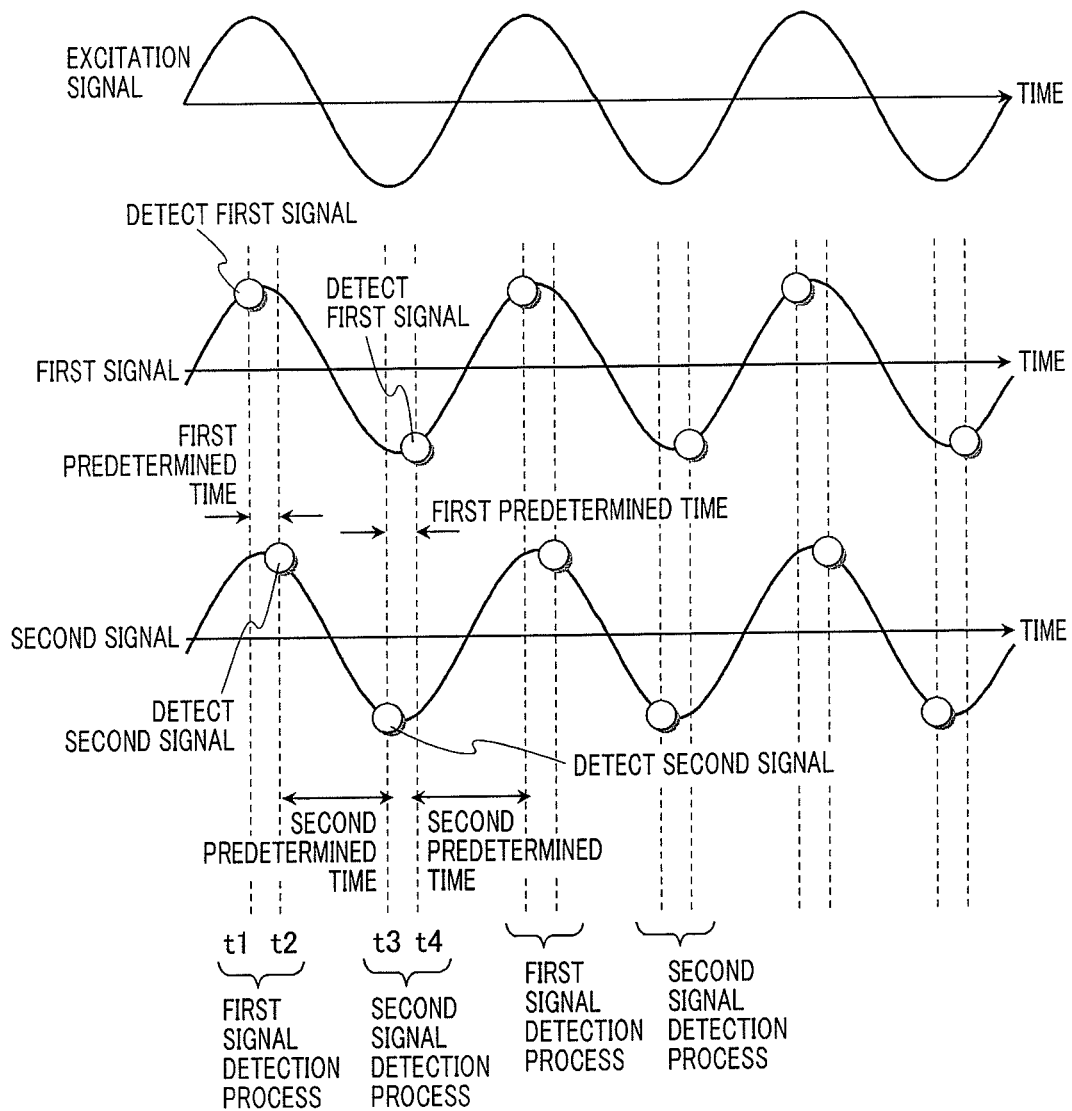
FIG. 7 is a view showing the timing at which a first signal and a second signal are detected for explaining the operation of a preferred embodiment 3 of the present invention.

FIG. 7 is a view showing the operation of the preferred embodiment 3 and a rotational angle is 45 degrees as in FIG. 2 of the preferred embodiment 1. Furthermore, a horizontal axis is time and a vertical axis is the amplitude of each signal.

An upper column of FIG. 7 is an excitation signal waveform; a middle column is a first signal waveform, and a lower column is a second signal waveform.

In the preferred embodiment 3, as shown in FIG. 7, the relationship of "first predetermined time $(\Delta T)$"+"second predetermined time"="0.5 period (0.5T) of excitation signal" is maintained, and the first signal detection process and the second signal detection process are made to synchronize with the excitation signal respectively.

Also in the preferred embodiment 3, the relationship of the aforementioned equation (1), (2), (3) and (4) is established in the first signal and the second signal which are sent by the resolver at time t.

The amplitude of the first signal in the preferred embodiment 3 will be found. The first signal $y1(t1)$ at time t1 is the following equation (37), and the first signal $y1(t4)$ at time t4 is equation (38).

$$y_1(t1)=A\cos\theta\cdot f(t1)+B \qquad (37)$$

$$y_1(t4)=A\cos\theta\cdot f(t4)+B \qquad (38)$$

Equation (39) is obtained by subtracting equation (38) from equation (37).

$$y_1(t1)-y_1(t4)=A\cos\theta\cdot(f(t1)-f(t4)) \qquad (39)$$

When the first predetermined time is $\Delta T1$, the relationship of the following equation (40) is established between time t1 and time t4.

$$t4=t1+0.5T+\Delta T1 \qquad (40)$$

Equation (41) is obtained from the relationship between the aforementioned equation (4) and equation (40).

$$f(t4)=f(t1+0.5T+\Delta T)=-f(t1+\Delta T) \qquad (41)$$

Equation (42) is obtained by substituting equation (41) into equation (39).

$$y_1(t1)-y_1(t4)=A\cos\theta\cdot(f(t1)-f(t4))=A\cos\theta\cdot(f(t1)+f(t1+\Delta T)) \qquad (42)$$

Similarly, the amplitude of the second signal will be found. The first signal $y2(t2)$ at time t2 is the following equation (43), and the second signal $y2(t3)$ at time t3 is equation (44).

$$y_2(t2)=A\sin\theta\cdot f(t2)+C \qquad (43)$$

$$y_2(t3)=A\sin\theta\cdot f(t3)+C \qquad (44)$$

Equation (45) is obtained by subtracting equation (44) from equation (43)

$$y_2(t2)-y_2(t3)=A\sin\theta\cdot(f(t2)-f(t3)) \qquad (45)$$

When the first predetermined time is $\Delta T1$, the relationship of the following equation (46) is established between time t2 and time t3.

$$t3=t2+0.5T-\Delta T1 \qquad (46)$$

Equation (47) is obtained from the relationship between the aforementioned equation (4) and equation (46).

$$f(t2)=f(t3-0.5T+\Delta T)=-f(t3+\Delta T) \qquad (47)$$

Equation (48) is obtained by substituting equation (47) into equation (45).

$$y_2(t2)-y_2(t3)=A\sin\theta\cdot(f(t2)-f(t3))-A\sin\theta\cdot(f(t3)+f(t3+\Delta T)) \qquad (48)$$

In FIG. 7, as described above, the relationship of the "first predetermined time $(\Delta T)$"+"second predetermined time"="0.5 period (0.5T) of excitation signal"; and therefore, the relationship of equation (49) is established between time t1 and time t3.

$$t3-t1=0.5T \qquad (49)$$

Equation (48) may be replaced with equation (50) from the relationship between the aforementioned equation (4) and equation (49).

$$y_2(t2)-y_2(t3)=A\sin\theta\cdot(f(t1)+f(t1+\Delta T)) \quad (50)$$

Equation (51) can be obtained from the aforementioned equation (42) and equation (50).

$$\frac{y_2(t2)-y_2(t3)}{y_1(t1)-y_1(t4)} = \frac{A\sin\theta\cdot(f(t1)+f(t1+\Delta T))}{A\cos\theta\cdot(f(t1)+f(t1+\Delta T))} = \frac{\sin\theta}{\cos\theta} = \tan\theta \quad (51)$$

Therefore, if in accordance with the following equation (52) using a four quadrant arc tangent a tan 2, a rotational angle θ of the resolver can be obtained.

$$\theta = \operatorname{atan2}\left(\frac{y_2(t2)-y_2(t3)}{y_1(t1)-y_1(t4)}\right) \quad (52)$$

Equation (35) described in the aforementioned preferred embodiment 2 is the same equation as equation (51).

Therefore, a flowchart showing processing steps of the angle detection method with the resolver in the preferred embodiment 3 is similar to FIG. 3 and FIG. 4, and is similar to the preferred embodiment 2 except for the point in which values of the first predetermined time and the second predetermined time are different.

Incidentally, in the case where the second signal is detected while sandwiching the peaks of the first signal and the second signal after the first signal is detected in the first signal detection process and the first signal is detected while sandwiching the peaks of the first signal and the second signal after the second signal is detected in the second signal detection process, the first predetermined time (ΔT) may be equal to or lower than 1/10 times of the excitation signal's period T, that is, ΔT≤0.1T.

Figure 8:
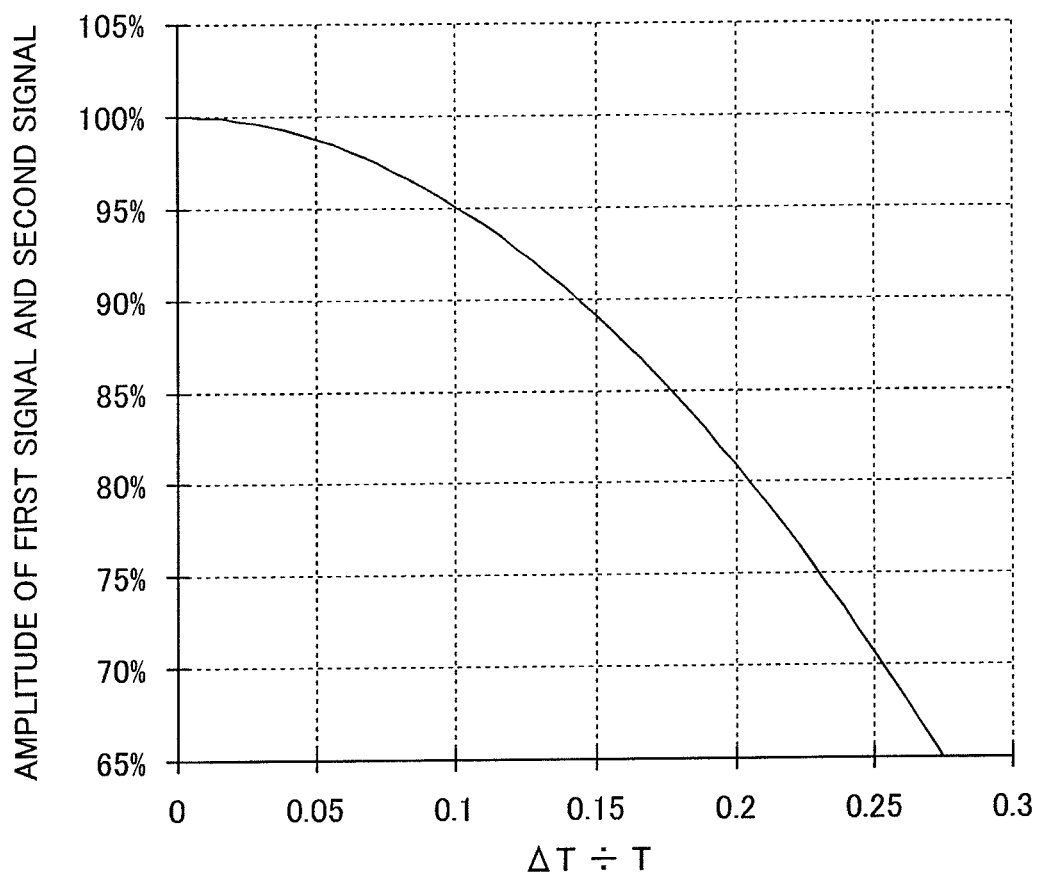
FIG. 8 is a view showing the relationship between the ratio of a first predetermined time to an excitation signal's period and the amplitude of the first signal and the second signal in the preferred embodiment 3 of the present invention.

FIG. 8 is a view which plots the relationship between the ratio of the first predetermined time ΔT to the excitation signal's period T "ΔT÷T" and the amplitude of the first signal and the second signal in the preferred embodiment 3.

If an S/N ratio is taken into account, the larger the amplitude of the first signal and the second signal to be detected, the better.

If amplitude degradation is equal to or lower than 5%, engineering influence may be assumed to be sufficiently small.

From the relationship of FIG. 8, if the ratio of the first predetermined time ΔT to the excitation signal's period T is "ΔT÷T≤0.1," the amplitude degradation can be equal to or lower than 5%. This shows that the first predetermined time (ΔT) may be equal to or lower than 1/10 times of the excitation signal's period T, that is, ΔT≤0.1T.

As described above, in the angle detection method with the resolver in the preferred embodiment 3, the second signal is detected while sandwiching the peaks of the first signal and the second signal after the first signal is detected in the first signal detection process and the first signal is detected while sandwiching the peaks of the first signal and the second signal after the second signal is detected in the second signal detection process; and therefore, advantageous effects are obtained in that the amplitude of the first signal and the second signal detected in the first signal detection process can be large, and the amplitude of the first signal and the second signal detected in the second signal detection process can also be large and thus the S/N ratio is enhanced to suppress error against noise.

Furthermore, in the angle detection method with the resolver in the preferred embodiment 3, the second predetermined time is set within the half period of the excitation signal; and therefore, the time difference between the first signal detection process and the second signal detection process can be shortened and thus changes of a rotational position in the first signal detection process and a rotational position in the second signal detection process can be sufficiently shortened even when the rotational angle is changed. Therefore, an advantageous effect is obtained in that the rotational angle can be accurately detected even in the case where the resolver angel is rotated.

Additionally, the aforementioned equation (52) is established even when the respective timings of sampling continuously performed two times are not deviated by equal times from the peak respectively while sandwiching the peak; and even in this case, the angle can be accurately detected. Therefore, an advantageous effect is obtained in that desired detection accuracy is maintained even when the phase difference between an outbreak time of the peak amplitude of each of two phase signals and the excitation signal of the resolver is individually different due to variations in manufacture or the like and is changed due to a change in temperature of the resolver.

Various modifications and alternations of this invention will be apparent to those skilled in the art without departing from the scope and spirit of this invention, and it should be understood that this is not limited to the illustrative embodiments set forth herein.

What is claimed is:

1. An angle detection method with a resolver, said method comprising detecting a rotational angle of a rotator by synchronously detecting a first signal and a second signal that are two phase sine wave modulation signals obtained from a one phase excitation/two phase output resolver, said method further comprising:
   a first signal detection process which detects a signal in the order of the first signal and the second signal;
   a second signal detection process which, after a predetermined time has elapsed after completion of the first signal detection process, detects a signal in the order of the second signal and the first signal; and
   calculating a rotational angle of the resolver using signals detected by the first signal detection process and the second signal detection process.

2. The angle detection method with the resolver according to claim 1,
   wherein said first signal detection process and said second signal detection process are performed at opposing sides of zero cross points of the first signal and the second signal.

3. The angle detection method with the resolver according to claim 1,
   wherein said first signal detection process is executed within a half period of an excitation signal of said resolver.

4. The angle detection method with the resolver according to claim 1,
   wherein said first signal detection process and said second signal detection process are performed excluding the vicinity of the zero cross points of the first signal and the second signal.

5. The angle detection method with the resolver according to claim 1,
   wherein said first signal detection process and said second signal detection process are performed in the vicinity of the peak of the excitation signal.

6. The angle detection method with the resolver according to claim 1,
  wherein, in said first signal detection process, the second signal is detected at an opposing side of the peaks of the first signal and the second signal, relative to the first signal, after the first signal is detected; and
  in said second signal detection process, the first signal is detected at an opposing side of the peaks of the first signal and the second signal, relative to the second signal, after the second signal is detected.

7. The angle detection method with the resolver according to claim 1,
  wherein said second signal detection process is executed within a half period of the excitation signal after said first signal detection process is executed.

\* \* \* \* \*